Figure 1:
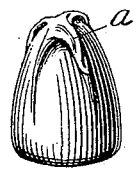

(No Model.) 2 Sheets—Sheet 1.

J. R. STOUT & W. N. HARTSHORN.
DEVICE FOR DIPPING CHOCOLATES.

No. 574,960. Patented Jan. 12, 1897.

WITNESSES:
C. E. Ashley
H. W. Lloyd.

INVENTORS:
John R. Stout and
Willis N. Hartshorn,

By their Attorneys, (No Model.) 2 Sheets—Sheet 2.
J. R. STOUT & W. N. HARTSHORN.
DEVICE FOR DIPPING CHOCOLATES.
No. 574,960. Patented Jan. 12, 1897.
FIG. 10.
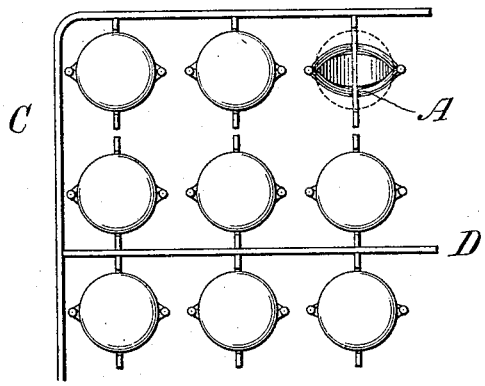
FIG. 11. FIG. 12.
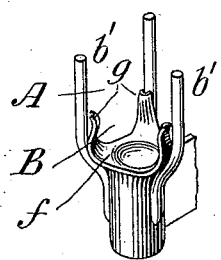 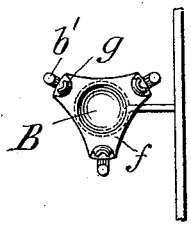
FIG. 13.
FIG. 14.
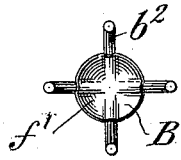 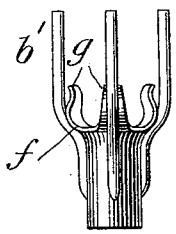
FIG. 15. FIG. 16. FIG. 17.
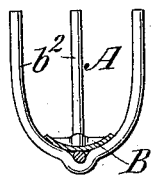 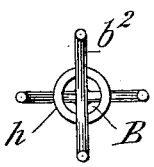 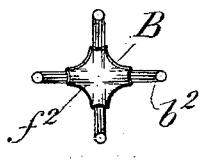
FIG. 18.
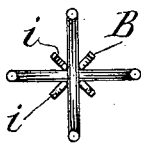
WITNESSES:
C. E. Ashley
H. W. Lloyd
INVENTORS:
John R. Stout and
Willis N. Hartshorn,
By their Attorneys,

UNITED STATES PATENT OFFICE.

JOHN R. STOUT AND WILLIS N. HARTSHORN, OF BROOKLYN, NEW YORK.

DEVICE FOR DIPPING CHOCOLATES.

SPECIFICATION forming part of Letters Patent No. 574,960, dated January 12, 1897.

Application filed June 3, 1896. Serial No. 594,115. (No model.)

*To all whom it may concern:*

Be it known that we, JOHN R. STOUT and WILLIS N. HARTSHORN, citizens of the United States, and residents of Brooklyn, in the county of Kings and State of New York, have invented certain new and useful Improvements in Devices for Dipping Chocolates, of which the following is a specification.

This invention relates to devices for use in dipping bonbons, cream drops, or other such confections in the chocolate covering or other coating therefor.

In the making of chocolate cream drops and other similar confections the drop or core or center is immersed in the coating material, which is of the consistency of thick cream, and is then lifted out therefrom, allowed to drain slightly, and then placed right side up on a sheet of paper or other receptacle. This operation is performed by hand in the manufacture of the best confections, whereby the coating is applied to the upper part or apex of the core with a pleasing degree of irregularity, by which hand-covered chocolates are distinguishable at a glance from those dipped by any of the mechanical accessories heretofore devised. The expense of coating candies one at a time is, however, a serious item, and it is desirable to provide a substitute therefor by which the expense shall be reduced and which at the same time shall impart to the candies an irregularity of appearance approximating sufficiently to the result of hand-coating to make the mechanically-dipped candies acceptable to the public taste. It is the aim of our invention to provide a means for dipping which will meet this requirement.

To this end our invention provides a chocolate-dipper constructed as a skeleton cup adapted to hold and properly guide the core while being dipped, the peculiarity of which cup, according to our invention, is the provision of a "retainer" formed as a socket, hollow, or small cup at its lower part, adapted to stand, preferably, a short distance beneath the apex of the inverted core and to retain a mass of the coating material in greater or less contact with said apex, so that when the core has been dipped and lifted out of the preparation and the core has been freed in any usual way from the excess of coating material this little socket will retain a small mass of the material, and upon inverting the dipper to deposit the core upon the paper the lifting off of the dipper will carry up by adhesion a small mass of coating material while it remains cohesively attached to the coating upon the core, so that this portion of the material will be drawn out during the act of lifting off the dipper into a string, and upon the breaking of the string it will partly contract and will fall back on the candy, forming a sort of tear, known to confectioners as the "stroke."

Figure 2:
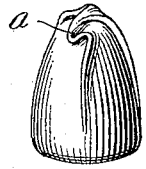
Figure 3:
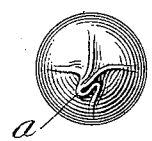
Figure 4:
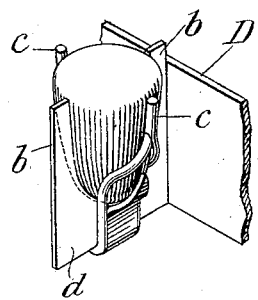
Figure 5:
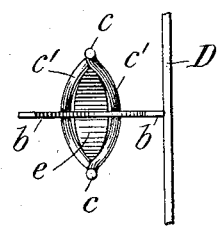
Figure 6:
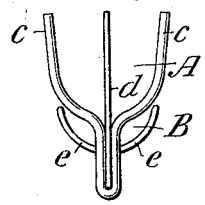
Figure 7:
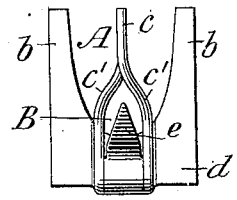
Figure 8:
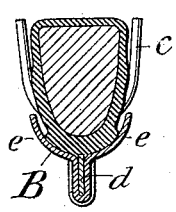
Figure 9:
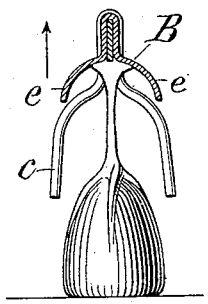

In the accompanying drawings, Figures 1 and 2 are perspectives, and Fig. 3 a plan, of a chocolate cream drop, showing this stroke, which is lettered *a*. Fig. 4 is a perspective view of the preferred form of our dipper, with the cream drop in place therein. Fig. 5 is a plan, and Figs. 6 and 7 are respectively front and side elevations, of this dipper. Fig. 8 is a section through the dipper and cream drop, showing the latter in the condition in which it is lifted out by the dipper just before turning it over. Fig. 9 is a sectional view showing the dipper inverted, the cream drop deposited on the paper, and the dipper in the act of being lifted off. Fig. 10 is a plan showing a frame carrying a number of the dippers in order to dip a great many of the drops together. Figs. 11, 12, and 13 are respectively a perspective plan and elevation of a modified construction. Figs. 14 and 15 are respectively a plan and vertical section of a further modification. Fig. 16 is a plan of another modification. Figs. 17 and 18 are plans of two other modifications.

In coating chocolate drops by hand when the operator deposits the cream drop on the paper she draws up with her fingers a surplus of the coating, the latter forming a string between the drop and her fingers as her fingers leave the drop, and this string quickly breaks, contracts upon itself in falling, and then falls down more or less upon the side of the drop, thereby forming the stroke *a*, examples of which are shown in Figs. 1, 2, and 3. The shape of this stroke varies, of course, very greatly in different candies, but its presence constitutes the distinguishing mark of hand-dipped candies.

The dipper provided by our invention is constructed as a skeleton cup with upright arms or bars for embracing the core and holding it in place and with a retainer or socket beneath the apex of the core, adapted to retain a small mass of the coating material or chocolate in contact therewith.

In the preferred construction (shown in Figs. 4 to 9) there are four upright arms, (lettered $b\ b$ and $c\ c$, respectively,) the arms $b\ b$ being preferably formed as parts of a metal plate $d$. The arms $c\ c$ are preferably formed of wire and are preferably forked as they extend downwardly, dividing into two arms $c'$, Fig. 7, which diverge and are soldered or otherwise united to the plate $d$. The retainer or socket beneath is formed of wings $e\ e$, of sheet metal, preferably of one strip, which is folded around the bottom of the plate $d$ and soldered thereto. The wings $e$ partly coincide with the spaces of the bifurcations $c'$, but are located lower down.

The skeleton cup, by which the core is supported and which answers to chocolate-dippers as heretofore constructed, is as a whole lettered A. The retainer or socket or auxiliary cup, for carrying the mass of coating material beneath the apex of the core to be coated, is as a whole lettered B. In this preferred construction this retainer B has its bottom formed by the wings $e$ and its sides formed in part by the bifurcated wires $c'$, there being a lateral opening between the wings and wires, which is designedly provided to facilitate the escape of the surplus or excessive portion of the chocolate or coating preparation, the latter being of such thick consistency that it does not readily flow, and notwithstanding the open character of the retainer B an ample quantity of the preparation remains in it after the excess of chocolate has drained off from the drop which has been coated. The mass thus remaining is indicated in Fig. 8. Such is the adhesive character of the coating preparation that when the dipper is inverted over the sheet of paper and the drop deposited upon the paper and the dipper then lifted off therefrom the small mass of the preparation which was carried up by the retainer or socket remains largely adhering thereto and also cohering to the drop, so that in lifting the dipper, as shown in Fig. 9, a coarse thread or string of chocolate is drawn between them, as indicated, and pulled out until it breaks, whereupon its lower portion drops back upon the chocolate drop, as in the case of hand-dipping, and forms the stroke $a$ thereon. Its length is somewhat exaggerated in Fig. 9.

It is within our invention to employ dippers of this character, singly, by providing them with a suitable handle, and if so employed they would have the advantage over hand-coating of insuring a more cleanly manipulation. In manufacturing practice, however, it is desirable to dip a great number of drops together, and to this end the desired number of dippers are connected together upon a frame, so as to constitute a dipping-tray. A fragment of such a tray is shown in Fig. 10, where C designates its outer frame, and D a cross bar or plate, the individual dippers being attached to the parts of the frame in the manner shown in Figs. 4 and 5, for example, where they are shown attached to the bar or plate D, or any other mode of attachment may be substituted, the particular means of carrying the dippers in a frame or tray being immaterial to our invention.

Figs. 11, 12, and 13 show a modification in which three upright arms are employed, here lettered $b'$, while beneath them the retainer or socket B is formed of a plate of thin sheet metal $f$, stamped out triangularly with its three arms bent up against the wire arms, forming tips $g\ g$, which serve in connection with the wires $b'$ to hold the core in correct position, while at the same time they contribute to embrace and thereby retain in the socket the mass of coating preparation, the excess of which can readily escape through the spaces between these upturned arms.

Figs. 14 and 15 show our invention as applied to a very common construction of chocolate-dipper in which the skeleton cup is formed of four upright arms $b^2$, made by bending wires into U shape and applying them so as to cross one another. The retainer B is formed of a disk $f'$, of sheet metal, preferably slightly embossed to embrace the intersecting wires and concaved to form a shallow cup for receiving the coating material. It is soldered to the intersection of the wires.

Fig. 16 shows another mode of applying our invention in connection with a skeleton cup made of two crossing U-shaped wires. The retainer B is here formed of a small wire ring $h$, which is soldered to the wires so as to encircle their intersection, the crossing wires $b^2$ being the same as in Figs. 14 and 15.

Fig. 17 shows a further modification, the retainer B being formed as in Figs. 14 and 15, except that the metal plate, here lettered $f^2$, is cut away between the upright arms, so that it serves to only partly fill the spaces between the arms at their intersection. It may be a piece of thin metal soldered on or it may be formed in any other manner. The formation of a concavity in its top is not absolutely essential, although desirable.

In Fig. 18 the retainer B is formed by soldering two wires $i\ i$ beneath the intersection of the arms, so as to project obliquely between the arms and preferably below their intersection. Sufficient of the coating material will adhere to these projecting wires and cling around the intersection of the arms to accomplish the result aimed at by our invention. This result, we have ascertained, cannot be accomplished by the mere intersection of two wires, some additional provision being necessary to retain sufficient of the coating material for the purpose of forming the stroke.

Our invention may be otherwise modified, it being only necessary that there be added to any ordinary or suitable construction of skeleton cup adapted to hold the core to be dipped some retaining means constituting in greater or less degree a socket located just beneath the core while in the dipping position and adapted to retain a small mass of the coating material in such proximity to the core as to be continuous with the coating applied thereto, so that upon inverting the dipper and lifting it off from the coated core or drop the small mass of material held by the retainer shall be drawn out between the drop and socket in essentially the manner described.

Any appendage or provision additional to the mere skeleton cup necessary for sustaining the core, having sufficient surface to retain a suitable surplus of the coating material and properly located with reference to the core so as upon inversion to apply this surplus to the core in the manner described, constitutes a retainer in the sense in which we have used that word in this specification.

Our invention is not confined to any one location of the retainer nor to the application of the dipper to candies of any definite shape. The dipper may be modified according to the shape of the core which is to be dipped, and the location of the retainer with reference to the body of the dipper can be varied according to the position on the candy at which the stroke is desired.

We claim as our invention the following-defined novel features, substantially as hereinbefore specified, namely:

1. A chocolate-dipper constructed as a skeleton cup with arms for holding the core and with a retainer formed with surfaces beneath the core and out of contact therewith, adapted to retain a mass of the coating material adjacent to the core and to partially release this material when inverted and lifted off the core, whereby the released material drops back onto the core and forms a stroke.

2. A chocolate-dipper constructed as a skeleton cup with arms for holding the core, and with a retainer for retaining a mass of the coating material beneath the core, said retainer constructed with lateral openings adapted to permit the excess of coating material to escape.

3. A chocolate dipper constructed as a skeleton cup with arms for holding the core, and with a retainer formed as a socket beneath but out of contact with the core, adapted to retain a mass of coating material beneath and adjacent to the core, said socket constructed with a metal plate forming its bottom.

4. A chocolate-dipper constructed with upright arms $b$ $c$, and a retainer B constructed of tongues $e$ of sheet metal.

5. A chocolate-dipper constructed with upright arms $b$ and $c$, the latter bifurcated at $c'$, and a retainer B constructed with tongues $e$ $e$ of sheet metal approximating in shape to the bifurcation of said arms, and located beneath the same.

In witness whereof we have hereunto signed our names in the presence of two subscribing witnesses.

JNO. R. STOUT.
WILLIS N. HARTSHORN.

Witnesses:
CHARLES K. FRASER,
FRED WHITE.